(12) United States Patent
Eltantawy et al.

(10) Patent No.: US 11,397,580 B2
(45) Date of Patent: Jul. 26, 2022

(54) METHODS, DEVICES, AND MEDIA FOR REDUCING REGISTER PRESSURE IN FLEXIBLE VECTOR PROCESSORS

(71) Applicants: Ahmed Mohammed ElShafiey Mohammed Eltantawy, Markham (CA); Ning Xie, Newmarket (CA)

(72) Inventors: Ahmed Mohammed ElShafiey Mohammed Eltantawy, Markham (CA); Ning Xie, Newmarket (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/024,349

(22) Filed: Sep. 17, 2020

(65) Prior Publication Data

US 2022/0083337 A1    Mar. 17, 2022

(51) Int. Cl.
*G06F 9/30* (2018.01)
*G06F 9/38* (2018.01)
*G06F 8/41* (2018.01)

(52) U.S. Cl.
CPC ........ *G06F 9/30036* (2013.01); *G06F 8/4441* (2013.01); *G06F 9/30112* (2013.01); *G06F 9/3855* (2013.01)

(58) Field of Classification Search
CPC . G06F 9/30036; G06F 9/30112; G06F 8/4441
See application file for complete search history.

(56) References Cited

U.S. PATENT DOCUMENTS

| | | | | |
|---|---|---|---|---|
| 5,946,491 | A * | 8/1999 | Aizikowitz | G06F 8/441 717/158 |
| 2005/0055536 | A1 | 3/2005 | Ansari | |
| 2007/0124722 | A1* | 5/2007 | Gschwind | G06F 8/445 717/106 |
| 2008/0065863 | A1* | 3/2008 | Eichenberger | G06F 9/30032 712/224 |
| 2008/0307403 | A1 | 12/2008 | Heishi et al. | |
| 2015/0193234 | A1* | 7/2015 | Udayakumaran | G06F 8/441 712/3 |

FOREIGN PATENT DOCUMENTS

| | | |
|---|---|---|
| CN | 101523349 A | 9/2009 |
| CN | 102200905 A | 9/2011 |

* cited by examiner

*Primary Examiner* — Wei Y Zhen
*Assistant Examiner* — Amir Soltanzadeh

(57) ABSTRACT

Methods, devices and media for reducing register pressure in flexible vector processors are described. In various embodiments described herein, methods, devices and media are disclosed that selectively re-scalarize vector instructions in a sequence of instructions such that register pressure is reduced and thread level parallelism is increased. A compiler may be used to perform a first method to partially or fully scalarize vectorized instructions of a code region of high register pressure. A compiler may be used to perform a second method to fully scalarize a sequence of vectorized instructions while preserving associations of the scalar instructions with their original vectorized instructions; the scalar instructions may then be scheduled and selectively re-vectorized. Devices executing code compiled with either method are described, as are processor-readable media storing code compiled by either method.

19 Claims, 12 Drawing Sheets

| Instructions in Order | # Registers |
|---|---|
| N1 | 4 |
| N2 | 8 |
| N4-1 (tmp1) | 9 |
| N3-1 (tmp2) | 8 |
| N5-1 | 7 |
| N4-2 (tmp1) | 8 |
| N3-2 (tmp2) | 7 |
| N5-2 | 6 |
| N4-3 (tmp1) | 7 |
| N3-3 (tmp2) | 6 |
| N5-3 | 5 |
| N4-4 (tmp1) | 6 |
| N3-4 (tmp2) | 5 |
| N5-4 | 4 |
| N6 | 8 |
| N7 | 4 |

METHODS, DEVICES, AND MEDIA FOR REDUCING REGISTER PRESSURE IN FLEXIBLE VECTOR PROCESSORS

RELATED APPLICATIONS

This is the first patent application related to this matter.

FIELD

The present disclosure is related to methods, devices and media for increasing the efficiency of vector processors, and in particular to methods, devices and media for reducing register pressure in flexible vector processors.

BACKGROUND

A vector processor (also called an array processor) is a processor device, such as a central processing unit (CPU) or graphics processor unit (GPU), that implements an instruction set containing some instructions (called "vector instructions") that operate on one-dimensional arrays of data called vectors, such that a single operation is performed on each scalar element of the vector. A vector processor is defined in contrast to conventional scalar processors, whose instructions (i.e. scalar instructions) operate on single data items (i.e. scalar values). In some contexts, vector processors may improve performance, such as numerical simulation and graphical rendering.

Instruction scheduling (also called simply "scheduling" herein) is a process performed by a software compiler as part of the process of converting human-readable source code into processor-executable machine code. A compiler schedules instructions to optimize instruction-level parallelism, which may improve the performance of some processors. The functional module or process of a compiler that performs scheduling may be called a scheduler.

Scheduling may need to overcome a number of difficulties. Increasing instruction level parallelism (ILP) may make the optimization task of a scheduler more complex. The scheduler may also need to avoid spilling, which is what happens when values need to be loaded from or stored in a memory because the processor has an insufficient number of registers to store all values currently being used by the scheduled instructions of the processor. Loading and storing from a memory (such as a random access memory (RAM)) is much slower than loading or storing values in registers of the processor. Spilling is usually a concern of a preliminary scheduling process called the pre-register allocation (pre-RA) scheduler that generates a preliminary schedule for the instructions in the source code before each value created or used in the source code is allocated to a specific register.

In graphics processing units (GPUs), there may be additional scheduling concerns. A GPU may include a large number of independent hardware scheduling units called threads, each of which can schedule and process data in parallel. In GPUs, the register file (i.e. the set of GPU registers which can store values) is shared between all threads. Thus, the more registers a given thread consumes, the fewer threads can run in parallel. Spilling is also extremely expensive in GPUs due to the increased latency involved in accessing memory relative to the time required to access the register file.

Furthermore, GPUs have another type of parallelism in addition to ILP called thread level parallelism (TLP). Warps are groups of threads that are scheduled for execution together. A single execution unit of the GPU may have a single execution pipeline, but it keeps track of the state of multiple warps. Each cycle, a subsystem of the GPU called the hardware warp scheduler picks a ready warp to schedule. However, if a warp is not considered ready if its next instruction is not ready, i.e. the warp is waiting for a previous instruction to finish.

Thus, in a GPU, latency can be dictated by a number of factors. In a first scenario, wherein the GPU has a very large number of warps (i.e. high TLP), the execution pipeline will always be busy and will never stall (i.e. will never remain idle, thereby introducing unnecessary latency). Even if the ILP of the code is very high (i.e., the code contains a large number of no-op instructions that occur when an instruction has to wait for one or more cycles for another instruction to complete), the execution pipeline will always have another warp that can be executed in place of the warp containing the no-op instruction.

In a second scenario, the TLP is low due to an insufficient number of warps. High ILP then potentially becomes critical for performance.

In a third scenario, the instruction pipeline contains a large number of long latency operations. This may require both high TLP and high ILP to reduce the frequency of stalls.

Thus, there is a need for compilers that can optimize the scheduling of instructions for vector processors to maximize ILP and/or TLP to improve the performance of the processor.

SUMMARY

In various embodiments described herein, methods, devices and media are disclosed that reduce register pressure in flexible vector processors. Register pressure refers to the oversaturation or overpopulation of registers with values being used by pending instructions such that spilling becomes a risk. Flexible vector processors are processors that are capable of executing both scalar instructions and vector instructions. Whereas multiple scalar instructions may be vectorized (i.e. converted into a single vector instruction) by a compiler to optimize the ILP of the code when executed by a flexible vector processor, in some cases excessive vectorization of code may result in high levels of register pressure, potentially leading to spilling and therefore reduced TLP and reduced performance. Example embodiments described herein may operate to selectively re-scalarize (i.e. re-convert back into scalar instructions) vector instructions in a sequence of instructions such that register pressure is reduced and TLP is increased.

The scheduler of a compiler—and in particular, its pre-RA scheduler—affects both TLP and ILP. Thus, one goal of a compiler is to optimize TLP and ILP using its pre-RA scheduler and post-RA scheduler. In performing this optimization, schedulers may be configured to categorize instructions into two broad types: fixed latency operations (which usually incur short latency) and variable latency operations (which usually incur long latency). This categorization may be used in some embodiments to group instructions by similar latency and thereby optimize TLP.

As used herein, the terms "vector instruction" and "vectorized instruction" may be used interchangeably to mean a single operation performed on a plurality of values. Similarly, the terms "scalar instruction" and "scalarized instruction" may be used interchangeably to mean a single operation performed on a single scalar value.

As used in the present disclosure, the term "vector processor" may refer to a same-instruction-multiple-data (SIMD) processing architecture that processes multiple elements of the data vector concurrently, or to processors configured to execute instruction "bursts": vector instructions that map to a sequence of scalar instructions operating on data in consecutive registers. Some burst-enabled vector processors may be configured to execute bursts of variable vector length; these processors may be referred to herein as "flexible vector processors". Thus, as used herein, the term "flexible vector processor device" means a processor device, such as a CPU or GPU, configured to execute both vector instructions and scalar instructions. In some embodiments, a flexible vector processor device may be configured to execute vector instructions of a variable vector length.

As used herein, the term "vector" refers to a linear array of multiple elements. A vector may be a data array. The "length" of the vector indicates the number of data elements in the vector, and may be used interchangeably with the term "width". The data elements of a vector are typically scalar data values.

As used herein, the term "scalarize" or "re-scalarize" refers to a process by which a vector is converted into its constituent scalar data elements, or by which a vector instruction is converted into its constituent scalar instructions. Similarly, the term "vectorize" or "re-vectorize" refers to a process by which a set of scalar data values is converted into a vector, or by which a set of scalar instructions is converted into a single vector instruction. When a vector instruction or vector is scalarized and then two or more of the resulting scalar instructions or scalars are re-vectorized, the length of the resulting vector instruction or vector may be the same or different from the original vector instruction or vector, as described in various examples below.

As used herein, a "sequence" of instructions refers to an ordered plurality of instructions. A "region" of a sequence of instructions refers to a set of one or more consecutive instructions in the sequence.

In some aspects, the present disclosure describes a method for reducing the number of registers required to execute a sequence of instructions using a processor device. The processor device is configured to execute vectorized instructions. A vectorized instruction comprises a single operation performed on a plurality of values. The method comprises receiving the sequence of instructions, replacing a vectorized instruction of the sequence with a plurality of shorter-length instructions such that a register pressure of the processor device at a first position in the sequence of instructions is reduced, and compiling the sequence of instructions into machine code executable by the processor device. The register pressure indicates a number of registers required to store a set of inputs and a set of outputs of the sequence of instructions at a position in the sequence of instructions.

In some examples, each shorter-length instruction comprises a scalar instruction, or a vectorized instruction having a vector length shorter than a vector length of the vectorized instruction being replaced.

In some examples, the method further comprises identifying a high-pressure region of the sequence of instructions including at least one high-pressure position at which the register pressure is above a register pressure threshold, and replacing each of one or more vectorized instructions in the high-pressure region with a plurality of shorter-length instructions such that the register pressure at the high-pressure position is reduced.

In some examples, identifying the high-pressure region comprises identifying the high-pressure position based on the register pressure of the high-pressure position, identifying a subsequent instruction that is dependent on an output of an instruction at the high-pressure position, identifying one or more additional instructions of the sequence of instructions such that the subsequent instruction is directly dependent on an output of each additional instruction, and defining the high-pressure region as comprising the instruction at the high-pressure position, the subsequent instruction, and each additional instruction.

In some examples, replacing each vectorized instruction in the high-pressure region with a plurality of shorter-length instructions comprises identifying a splitting factor for the high-pressure region, splitting each vectorized instruction into a number of shorter-length instructions equal to the splitting factor, and reordering the shorter-length instructions, such that the number of registers required to simultaneously store all values in use at the high-pressure position is reduced by a register pressure delta value.

In some examples, the method further comprises, after identifying the high-pressure region, identifying an expected register pressure delta value that can be achieved through replacing each vectorized instruction in the high-pressure region with a plurality of shorter-length instructions using the splitting factor, and in response to determining that the expected register pressure delta value does not satisfy a reduction criterion, re-defining the high-pressure region to include one or more instructions directly dependent upon the output of one of the instructions in the initial definition of the high-pressure region, or one or more instructions upon whose output one of the instructions in the initial definition of the high-pressure region is dependent.

In some examples, the reduction criterion is satisfied by an expected register pressure delta value that reduces the register pressure of the high-pressure position below the register pressure threshold.

In some examples, the reduction criterion is satisfied by an expected register pressure delta value that reduces a peak height of the register pressure of the high-pressure position below a peak height threshold. The peak height of the high-pressure position is defined as a difference between the register pressure of the high-pressure position and a baseline register pressure.

In some examples, the baseline register pressure is the higher of a register pressure at the beginning of the high-pressure region, and a register pressure at the end of the high-pressure region.

In some examples, replacing the vectorized instruction with a plurality of shorter-length instructions comprises, for each of a plurality of vectorized instructions of the sequence, replacing the vectorized instruction with a plurality of scalar instructions such that each scalar instruction is associated with a burst marker identifying the scalar instruction as part of a burst corresponding to the vectorized instruction.

In some examples, the burst marker includes a burst identifier corresponding to the vectorized instruction.

In some examples, the burst marker includes position information regarding a position of the scalar instruction within the burst. The position of the scalar instruction within the burst corresponds to a position within the vectorized instruction of an operation corresponding to the scalarized instruction.

In some examples, the method further comprises ordering the scalar instructions according to one or more scheduling heuristics, and re-vectorizing one or more of the scalar instructions.

In some examples, the one or more scheduling heuristics include at least one heuristic selected from the following: a register pressure heuristic for minimizing register pressure, a latency heuristic for minimizing latency, and a code size heuristic for minimizing code size by ordering two or more scalar instructions identified as part of the same burst adjacent to each other.

In some examples, re-vectorizing one or more of the scalar instructions comprises several steps. One or more groups of burst candidates are identified. Each group of burst candidates comprises a plurality of adjacent instructions identified as belonging to the same burst. Each instruction in a group of burst candidate is a burst candidate. For each burst candidate, all dependencies of the burst candidate are identified. Each dependency is an instruction upon whose output the burst candidate directly depends. In response to determining that the dependencies of a first burst candidate are all burst candidates, the group of burst candidates including the first burst candidate are re-vectorized.

In some examples, the method further comprises, in response to determining that at least one dependency of a second burst candidate is not a burst candidate, configuring the group of burst candidates including the second burst candidate such that the instructions in the group return their results to a group of consecutive registers.

In some aspects, the present disclosure describes a device. The device comprises a processor device configured to execute vectorized instructions, and a memory. A vectorized instruction comprises a single operation performed on a plurality of values. The memory stores machine code executable by the processor device, the machine code being compiled according to the method steps described above.

In some aspects, the present disclosure describes a processor-readable medium having tangibly stored thereon machine code executable by a processor device configured to execute vectorized instructions, the machine code being compiled according to the method steps described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and devices are described that reduce register pressure in flexible vector processors. Example embodiments described herein may operate to selectively re-scalarize (i.e. re-convert back into scalar instructions) vector instructions in a sequence of instructions such that register pressure is reduced and TLP is increased.

High register pressure can lead to spilling, which can have a detrimental effect on performance. In an example GPU, a general purpose register (GPR) has a known update latency, e.g., 8 cycles, which it incurs when it has to load a value from, or store a value in, a memory due to spilling. For a processor configured to operate according to a SIMD-32 architecture (in which 32 threads are executed at a time), a warp instruction is issued in two segments (two cycles). For a processor configured to operate according to a SIMD-64 architecture (in which 64 threads are executed at a time), a warp instruction is issued in four segments (four cycles) if operation is in a full precision mode, and in two segments if the operation is in a half precision mode. Thus, to hide the 8-cycle latency incurred by a GPR update, the GPU needs to execute 8 cycles of instructions (i.e. 8 segments), corresponding to an ILP of either 4 instructions (for SIMd-32 or half-precision SIMD-64) or 2 instructions (for full-precision SIMD-64), or a TLP of 4 warps.

Register pressure typically rises and falls significantly within a given sequence of code, as values are created and stored, thereby increasing register pressure, and then each stored value is used by a subsequent instruction and its register cleared, thereby decreasing register pressure. Only code regions having high peaks of register pressure present the risk of spilling. Thus, embodiments described herein may attempt to identify high-pressure regions of code in which register pressure rises above some register pressure threshold value that represents a risk of spilling. Some or all vector instructions within these high-pressure regions may then be scalarized to reduce register pressure within the high-pressure region to an acceptable level.

Figure 1A:
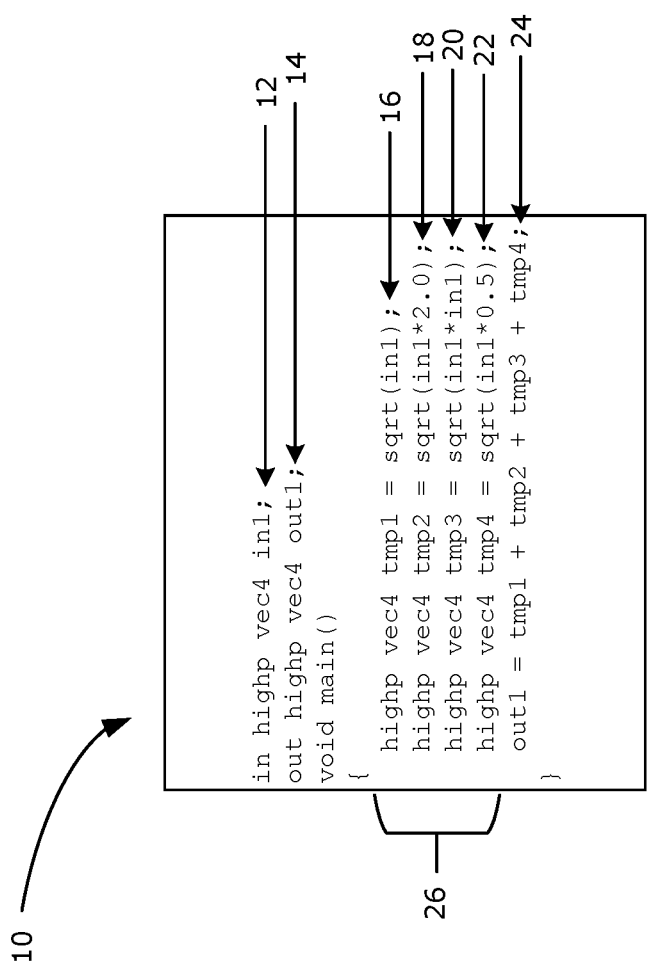
FIG. 1A shows a first block of source code including a number of vector instructions, showing an example of instructions to be optimized in accordance with examples described herein.
Figure 1B:
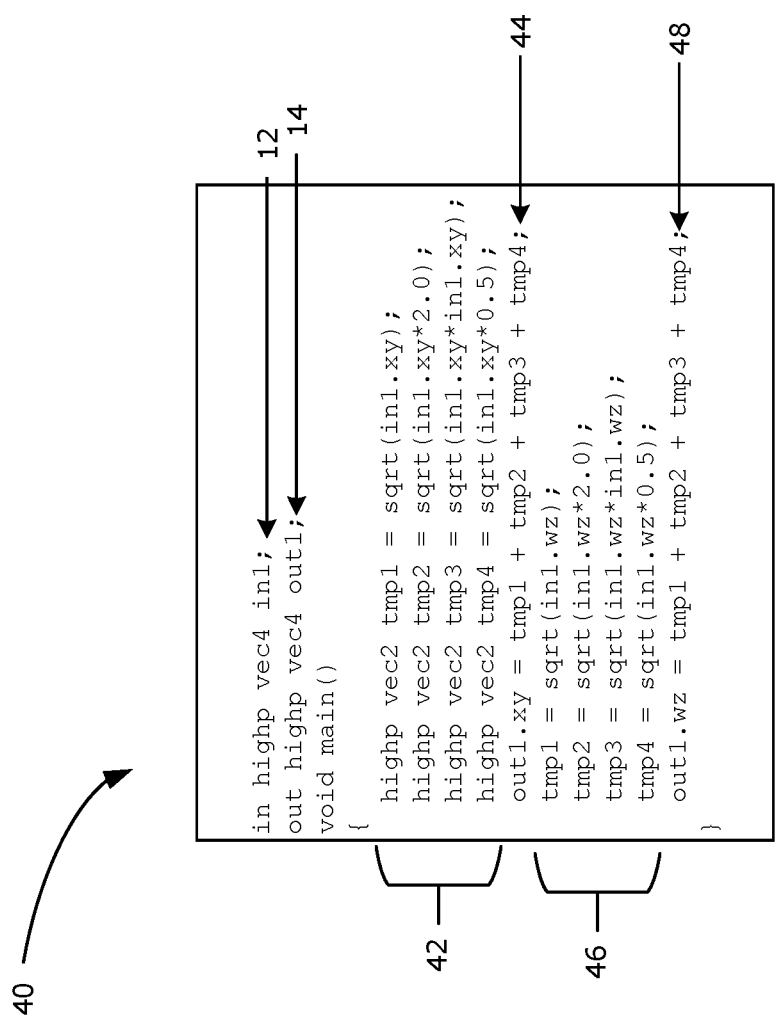
FIG. 1B shows a second block of partially-scalarized source code, in accordance with examples described herein.
Figure 1C:
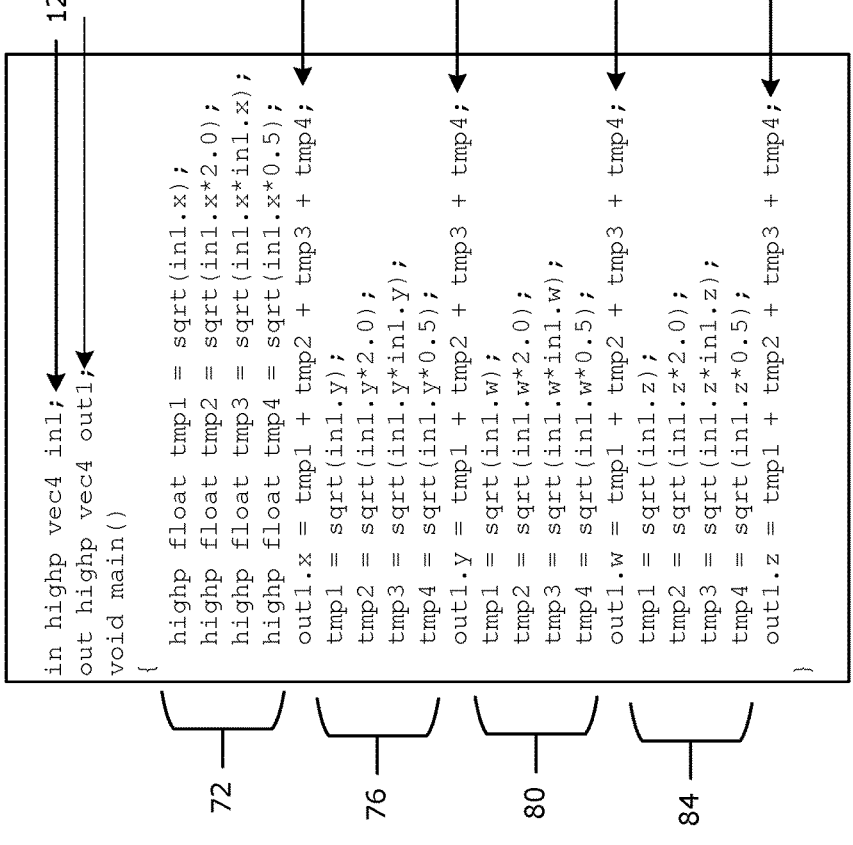
FIG. 1C shows a third block of fully-scalarized source code, in accordance with examples described herein.

FIGS. 1A-1C demonstrate a simple example of instruction scalarization to reduce register pressure.

FIG. 1A shows a block of source code 10 including several vector instructions. The source code 10 is a sequence of instructions that may be compiled into machine code by a compiler. The machine code may then be executed by a flexible compiler.

A first variable in1 12 is declared, having type "vec4", indicating a vector value of length four (i.e. occupying four registers). At this position in the execution of the sequence of instructions represented by the source code, four registers are in use. A second variable out1 14 is declared, also having type "vec4". At this position in the execution of the sequence of instructions, eight registers are in use.

A block of four instructions 26 follow. The first instruction 16 declares a temporary variable tmp1, also of type vec4, and assigns tmp1 the output of an operation sqrt(in1)

that returns the square root of in1 12. At this position, twelve registers are in use. The second instruction 18 declares a further temporary variable tmp2 of type vec4, and assigns tmp2 the output of an operation sqrt(in1*2.0). At this position, sixteen registers are in use. The third instruction 20 declares a further temporary variable tmp3 of type vec4, and assigns tmp3 the output of an operation sqrt(in1*in1). At this position, 20 registers are in use. The fourth instruction 22 declares a further temporary variable tmp4 of type vec4, and assigns tmp4 the output of an operation sqrt(in1*0.5). At this position, 24 registers are in use. The final instruction 24 assigns out1 14 the sum of temporary variables tmp1, tmp2, tmp3, and tmp4. The main( )block of the source code 10 then ends. During compilation, the compiler would need to schedule the instructions such that registers would be allocated to store the values of each variable (int, out1, tmp1, tmp2, tmp3, and tmp4) from its initial declaration until the final instruction 24, yielding the register pressure levels indicated above at each position in the sequence of instructions. The peak register pressure within the sequence of instructions compiled based on the source code 10 is 24 registers, at the position prior to the final instruction 24. Sixteen of these registers are occupied by the temporary variables tmp1, tmp2, tmp3, and tmp4.

FIG. 1B shows a second block of partially-scalarized source code 40 that produces the same results as the source code 10 of FIG. 1A. However, this source code 40 has converted some of the vector instructions of the first block of source code 10, which all used vector variables of length 4, into instructions using variables of length 2. This partial scalarization—i.e., the use of shorter length vector instructions instead of full-length vector instructions—reduces the register pressure of the sequence of instructions compiled from source code 40, as will be demonstrated.

Variables in1 12 and out1 14 are declared, as in the first block of source code 10. At this position, eight registers are in use.

A block of four instructions 42 follows. Each instruction corresponds to one of the four instructions 26 of the first block of source code 10, but in this case only two values (vector elements x and y) of the four values (w, x, y, z) of the vector variable in1 12 are operated upon, and the results are stored in temporary variables tmp1, tmp2, tmp3, and tmp4 that are each of type "vec2", indicating a vector value of length two (i.e. occupying two registers). After the execution of block 42, sixteen registers are in use (8 for in1 and out1, 8 for the four vec2 temporary variables).

The values stored in the temporary variables are then used by instruction 44.

After instruction 44, a second block of four instructions 46 follows. In this block 46, the same operations as the first block 42 are performed again, this time using the two remaining values (vector elements w and z) of the four values (w, x, y, z) of the vector variable in1 12. The temporary variables are re-used to store the results of these operations, meaning that their registers are cleared and re-populated with the results of the operations in block 46. Thus, after the execution of block 46, sixteen registers are in use, just as at the end of block 42.

A final instruction 48 uses the values stored in the temporary variables. The main( )block of the source code 40 then ends. The peak register pressure within the sequence of instructions compiled based on the source code 40 is 16 registers. Only eight of these registers are occupied by the temporary variables tmp1, tmp2, tmp3, and tmp4. Thus, the partial scalarization of source code 10 shown in source code 40 results in decreasing the peak register pressure of the sequence of instructions from 24 to 16, while increasing the number of individual instructions that are executed (i.e. the number of lines of source code).

FIG. 1C shows a third block of fully-scalarized source code 70 that produces the same results as the source code 10 of FIG. 1A and the source code 40 of FIG. 1B. However, this source code 70 has converted some of the vector instructions of the first block of source code 10, which all used vector variables of length 4, into scalar instructions using variables of length 1, i.e. scalar values (shown here as floating point numbers of type float). This full scalarization further reduces the register pressure of the sequence of instructions compiled from source code 70, as will be demonstrated.

Variables in1 12 and out1 14 are declared, as in the first block of source code 10. At this position, eight registers are in use.

A block of four instructions 72 follows. Each instruction corresponds to one of the four instructions 26 of the first block of source code 10, but in this case only one value (vector element x) of the four values (w, x, y, z) of the vector variable in1 12 is operated upon, and the results are stored in temporary variables tmp1, tmp2, tmp3, and tmp4 that are each of type "float", indicating a scalar variable. After the execution of block 72, twelve registers are in use (8 for in1 and out1, 4 for the four float temporary variables).

The values stored in the temporary variables are then used by instruction 74.

Instruction 74 is followed by a second block 76 repeating the four operations on the y element of in1 12, an instruction 78 making use of the temporary variables from the second block 76, a third block 80 repeating the four operations on the w element of in1 12, an instruction 82 making use of the temporary variables from the third block 80, a fourth block 84 repeating the four operations on the z element of in1 12, and an instruction 86 making use of the temporary variables from the fourth block 84. In each subsequent block 76, 80, 84, the temporary variables are re-used to store the results of these operations, meaning that their registers are cleared and re-populated with the results of the operations of the block. Thus, after the execution of each block 72, 76, 80, 84, twelve registers are in use. The peak register pressure within the sequence of instructions compiled based on the source code 70 is 12 registers. Only four of these registers are occupied by the temporary variables tmp1, tmp2, tmp3, and tmp4.

Thus, FIGS. 1A-1C demonstrate how a sequence of vector instructions can result in a high register pressure, and this register pressure can be reduced by partially or fully scalarizing at least some of the vector instructions in the sequence. The partially scalarized code 40 of FIG. 1B can be regarded as having split the vector code 10 of FIG. 1A by a splitting factor of two, i.e., each four-length vector has been reduced in length by a factor of two, resulting in two two-length vectors, each of which is operated upon by a separate, partially scalarized instruction. This reduces the register pressure attributable to the temporary variables by the same factor, i.e. the splitting factor of two. Similarly, the fully scalarized code 70 of FIG. 1C can be regarded as having split the vector code 10 of FIG. 1A by a splitting factor of four, i.e., each four-length vector has been reduced in length by a factor of four, resulting in four scalars, each of which is operated upon by a separate, scalarized instruction. This reduces the register pressure attributable to the temporary variables by the same factor, i.e. the splitting factor of four. Because the only code that is scalarized is the code region within the main( )block (i.e. block 26 and final instruction 24), and not the declaration of the variables in1 12 and out1 14, only the scalarized code region has its register pressure reduced. The register pressure attributable to the declaration of the variables in1 12 and out1 14 already exists at the beginning of the scalarized code region (i.e. the opening of the main( ) block) and continue to exist after the end of the scalarized code region (i.e. the closing of the main( )block), it may be considered to be a baseline register pressure (8 registers in this example). The peak height of the scalarized code region (i.e. the additional register pressure attributable to instructions within the region) of the vector code 10 is 8 registers; of the partially scalarized code 40 is 4 registers; and of the fully scalarized code 70 is 2 registers. Thus, the peak height of the region to which scalarization is applied is divided by the splitting factor of the scalarization process, and the total register pressure of the code region becomes the baseline register pressure plus the new (reduced) peak height.

In some embodiments, the baseline register pressure of a region of code may be determined as the higher of a register pressure at the beginning of the high-pressure region, and a register pressure at the end of the high-pressure region. In this example, these values are both 8.

It will be appreciated that, whereas FIGS. 1A-1C demonstrate how vector instructions can be manually scalarized by rewriting the source code, embodiments described herein may use a compiler to automatically convert vector instructions (such as the machine code instructions that would be generated by compiling source code 10) into a sequence of partially or fully scalarized instructions (such as the machine code instructions that would be generated by compiling source code 40 or 70) based on high-pressure regions of the sequence of instructions as detected by the compiler, without modification of the source code by a human programmer.

Example Computing Devices

Figure 2A:
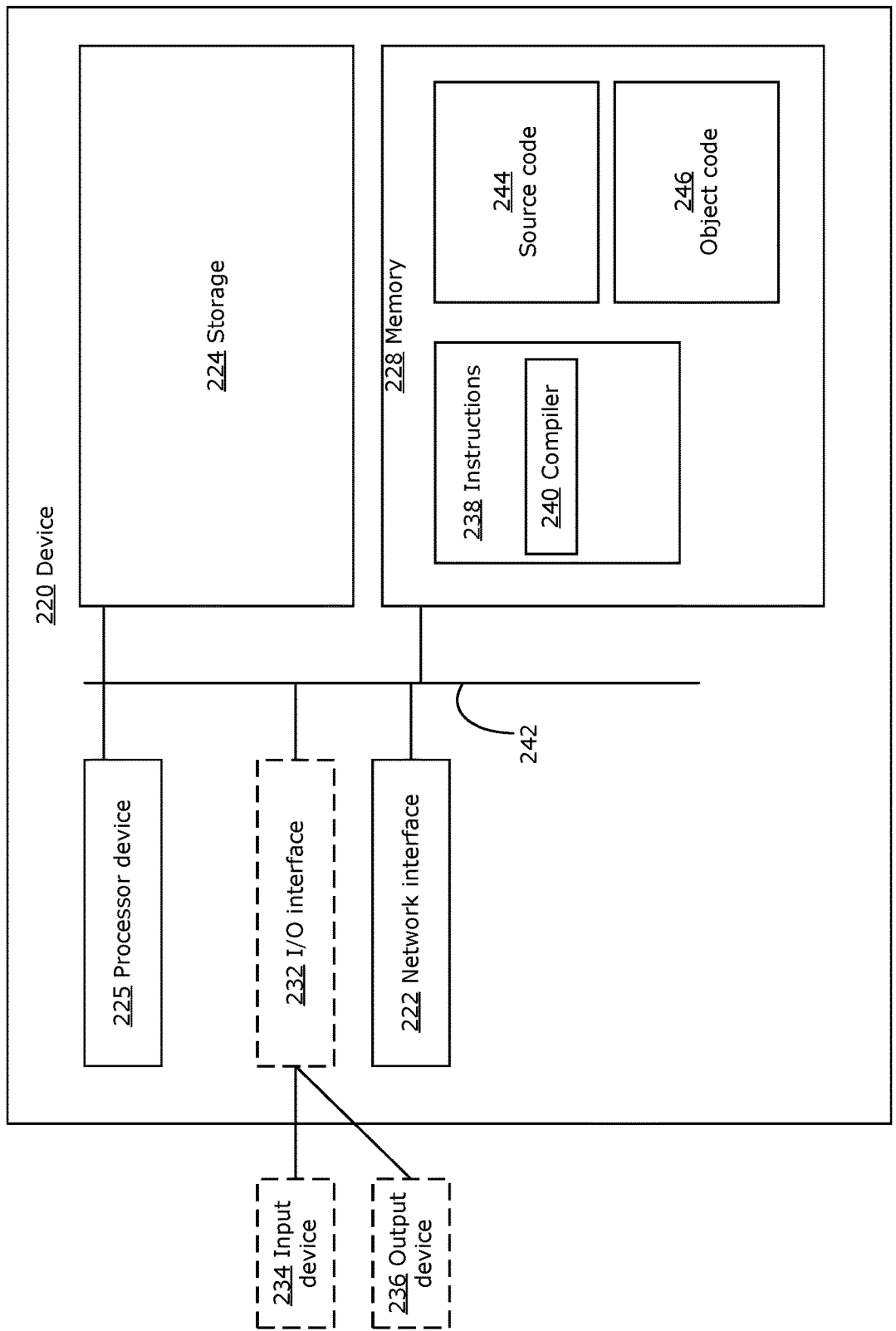
FIG. 2A shows a block diagram of a first example device suitable for implementation of examples described herein.

FIG. 2A is a block diagram illustrating a simplified example of a computing device 220, such as a computer or a cloud computing platform, suitable for carrying out examples described herein. Other examples suitable for implementing embodiments described in the present disclosure may be used, which may include components different from those discussed below. Although FIG. 2 shows a single instance of each component, there may be multiple instances of each component in the device 220.

The device 220 of FIG. 2A illustrates an environment in which source code may be compiled into machine code using the techniques described herein. The device 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The device 220 may also include one or more optional input/output (I/O) interfaces 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the device 220. In other examples, there may not be any input device(s) 234 and output device(s) 236, in which case the I/O interface(s) 232 may not be needed.

The device 220 may include one or more network interfaces 222 for wired or wireless communication with one or more devices or systems of a network, such as a network being modeled by the methods described herein. The network interface(s) 222 may include wired links (e.g., Ethernet cable) and/or wireless links (e.g., one or more antennas) for intra-network and/or inter-network communications.

The device 220 may also include one or more storage units 224, which may include a mass storage unit such as a solid state drive, a hard disk drive, a magnetic disk drive and/or an optical disk drive.

The device 220 may include one or more memories 228, which may include a volatile or non-volatile memory (e.g., a flash memory, a random access memory (RAM), and/or a read-only memory (ROM)). The non-transitory memory(ies) 228 may store instructions for execution by the processor device(s) 225, such as to carry out examples described in the present disclosure. The memory(ies) 228 may include other software instructions 238, such as for implementing an operating system and other applications/functions. In some examples, the memory(ies) 228 may include software instructions 238 for execution by the processor device 225 to implement a compiler 240, as described further below. The compiler 240 may be loaded into the memory(ies) 228 by executing the instructions 238 using the processor device 225.

The memory(ies) 228 may also include source code 244 loaded from storage 224 or from some other source. The compiler 240 may be executed by the processor device 225 to compile the source code 244 into machine code 246 as described herein.

In some examples, the device 220 may additionally or alternatively execute instructions from an external memory (e.g., an external drive in wired or wireless communication with the device 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The device 220 may also include a bus 242 providing communication among components of the device 220, including those components discussed above. The bus 242 may be any suitable bus architecture including, for example, a memory bus, a peripheral bus or a video bus.

It will be appreciated that various components and operations described herein can be implemented on multiple separate devices or systems in some embodiments.

Figure 2B:
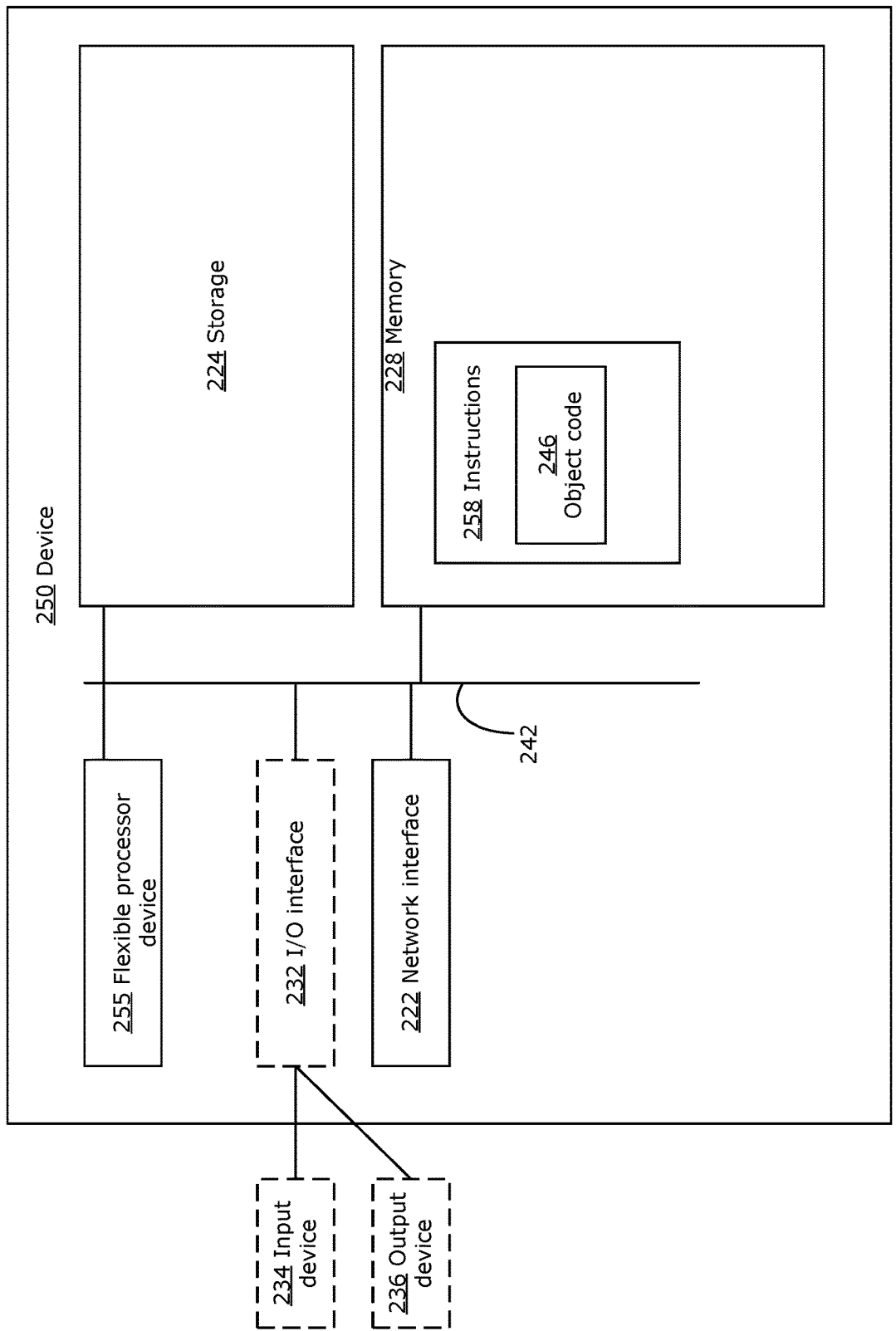
FIG. 2B shows a block diagram of a second example device suitable for execution of instructions generated in accordance with examples described herein.

FIG. 2B is a block diagram illustrating a simplified example of a second computing device 250, such as a computer or a cloud computing platform, suitable for executing machine code compiled as described herein, e.g., by compiler 240 of device 220. It will be appreciated that, in some examples, device 220 and device 250 may be the same device.

The second device 250 of FIG. 2A illustrates an environment in which machine code compiled using the techniques described herein may be executed. The device 250 includes many of the same components as device 220 indicated by identical numerals. However, the second device 250 includes a flexible vector processor device 255 as described above, i.e. a processor device configured to execute both vector instructions (potentially on vectors of variable length) as well as scalar instructions. A vector instruction or vectorized instruction, as described above, comprises a single operation performed on a plurality of values. Furthermore, the second device 250 has instructions 258 stored in its memory(ies) 228 that include the compiled machine code 246 compiled by the compiler 240 of first device 220.

In various embodiments, vectorization of instructions may be performed manually (i.e. specified in source code) or automatically (e.g., by a compiler). Some flexible vector processor devices 255 may be capable of specifying a vector length N for an instruction. The vectorization of N scalar instructions into a single N-length vector instruction may in some embodiments also involve building an N-length vector out of N scalar registers. The values of this vector, and the corresponding vector instruction, may be referred to as belonging to a single "burst". In some embodiments, the input and output registers of a vector instruction must be sequential or repeated. Thus, for example, given three scalar instructions max_v1(H16 H12 H8), max_v1(H17 H13 H9), and max_v1(H18 H14 H10), a compiler performing vectorization may define a single "burst" as the 3-length vector instruction fmax_v3(H16 H12 H8) and the associated registers H8-H10, H12-H14, and H16-H18. When vector instruction fmax_v3(H16 H12 H8) is executed by the flexible vector processor device 255, it is executed as three parallel operations that are equivalent to the original three scalar instructions.

Selective Vector Splitting and Reordering Method

Figure 3:
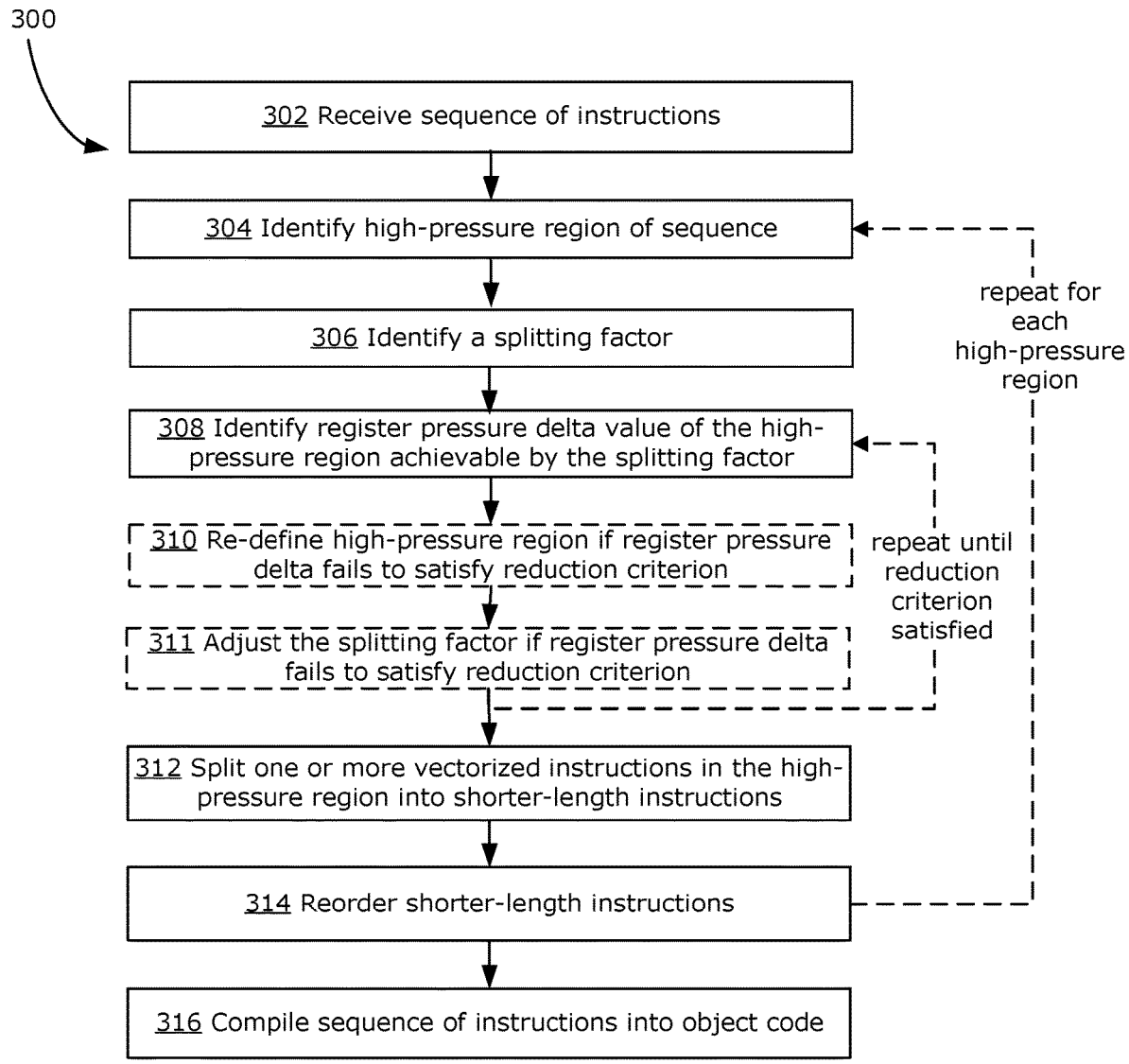
FIG. 3 is a flowchart showing steps of a first example method for reducing register pressure in a sequence of instructions, in accordance with examples described herein.

FIG. 3 is a flowchart showing steps of a first example method 300 for reducing register pressure in a sequence of instructions. Optional steps are indicated in dashed lines. The method 300 involves identifying a high-register pressure region (also called a "high-pressure region" herein) of a sequence of instructions, splitting one or more vector instructions into shorter-length instructions (i.e. either scalar instructions or vector instructions having a vector length longer than the original vector instructions), and reordering the shorter-length instructions to increase register re-use and thereby reduce the register pressure of the high-pressure region. The method 300 may be referred to herein as "selective vector splitting", followed by "reordering".

Method 300 may in some embodiments be implemented as part of a compiler, such as compiler 240, running on a processor device. The method 300 may be performed by a scheduler, such as a post-RA scheduler for re-scheduling and allocating registers for instructions that have already been ordered by a pre-RA scheduler. The method 300 is intended to reduce the number of registers required to execute a sequence of instructions using a flexible vector processor device.

At 302, the sequence of instructions is received. The sequence of instructions may be received by a post-RA scheduler of a compiler 240, from a pre-RA scheduler of the compiler 240. The sequence of instructions is ordered in sequence, e.g., by the pre-RA scheduler. The sequence of instructions includes at least one vector instruction.

Figure 4A:
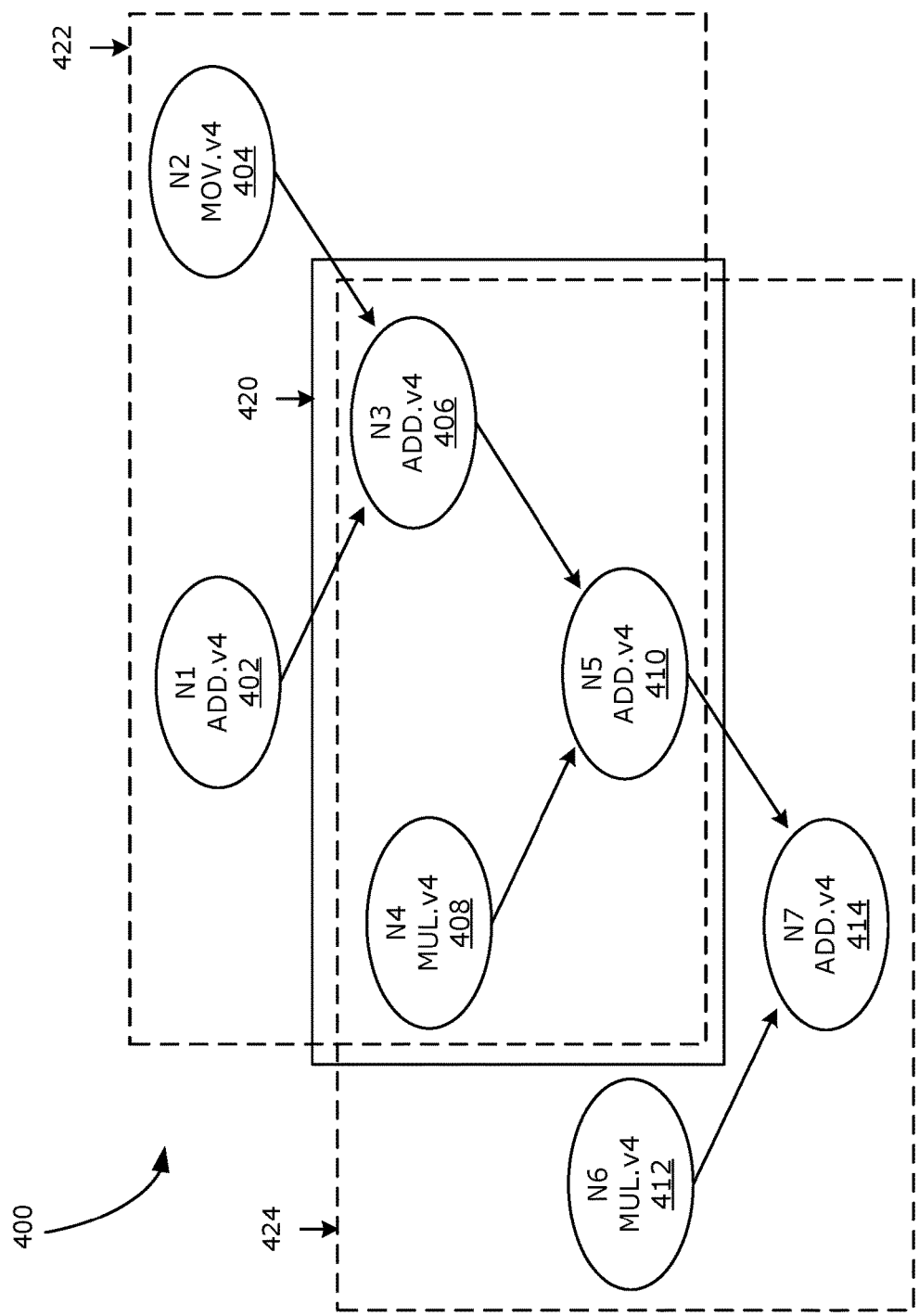
FIG. 4A is a graph showing instruction dependencies of a sequence of vector instructions, suitable for optimization in accordance with examples described herein.

FIG. 4A is a directed graph 400 showing instruction dependencies of an example sequence of vector instructions. The sequence of instructions includes seven instructions, shown as nodes N1 through N7 of the graph 400. Each node has data dependencies shown as arrows in the graph. The 4-length vector addition operation ("ADD.v4") of N3 406 is dependent upon the outputs of the ADD.v4 of N1 402 and the 4-length vector move operation ("MOV.v4") of N2 404. The ADD.v4 of N5 410 is dependent upon the outputs of N3 406 and the 4-length vector multiplication operation ("MUL.v4") of N4 408. The ADD.v4 of N7 414 is dependent upon the outputs of N5 410 and the MUL.v4 of N6 412. In this example, N1 402, N2 404, N4 408m and N6 412 are long-latency instructions, which is why the pre-RA scheduler has scheduled N4 408 ahead of N3 406, so that long-latency instruction N4 408 can continue executing while shorter-latency N3 406 is being issued and executing.

Figure 4B:
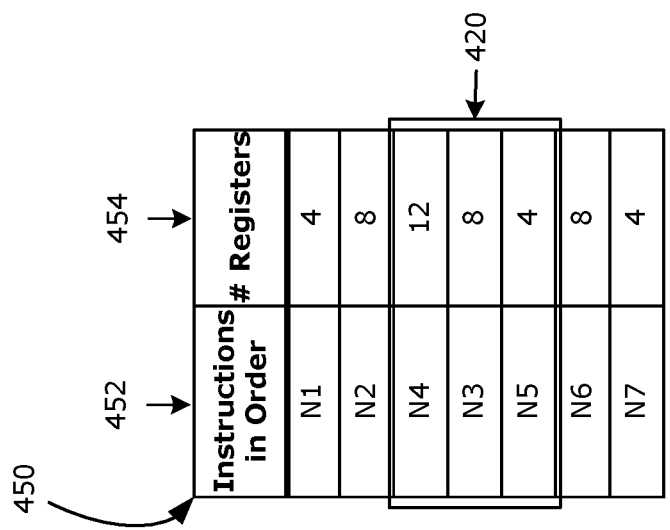
FIG. 4B is a table of register pressure values corresponding to various positions within the sequence of instructions of FIG. 4A.

FIG. 4B is a table 450 of register pressure values 454 corresponding to various positions within the sequence of instructions of FIG. 4A. The sequence of instructions is ordered (e.g., by the pre-RA scheduler) in the order indicated in the "Instructions in Order" column 452. After execution of N1 402, four registers are in use (to store the 4-length vector output of the ADD.v4 operation of N1 402). After execution of N2 404, eight registers are in use (the existing 4 from N1 402 and 4 more to store the 4-length vector output of the MOV.v4 operation of N2 404). After execution of N4 408, twelve registers are in use (the existing 8 and 4 more to store the 4-length vector output of the MUL.v4 operation of N4 408). After execution of N3 406, eight registers are in use (the 8 registers used by N1 and N2 are cleared, for a total of 4, but 4 more are added to store the 4-length vector output of N3 406). After execution of N5 410, four registers are in use (the 8 registers used by N3 and N4 are cleared, for a total of 0, but 4 more are added to store the 4-length vector output of N5 410. After execution of N6 412, eight registers are in use (the existing 4 and 4 more to store the 4-length vector output of N6 412). Finally, after execution of N7 406, four registers are in use (the 8 registers used by N5 and N6 are cleared, for a total of 0, but 4 more are added to store the 4-length vector output of N7 414).

Thus, the position following the execution of instruction N4 408 can be identified as the position in the sequence of instructions having the highest register pressure (i.e., 12 registers in use).

Returning to FIG. 3, at 304, a high-pressure region of the sequence of instructions is identified. The compiler 240 is able to assess the register pressure at each position in the ordered sequence of instructions, as illustrated above with reference to FIGS. 4A-4B. In some embodiments, a high-pressure region may be identified as any region including at least one high-pressure position at which the register pressure is above a register pressure threshold. In some embodiments, the register pressure threshold may be an operating parameter programmed into the compiler 240 that indicates a maximum register pressure level in order to avoid spilling risk in the context of the flexible vector processor for which the compiled code is intended. It will be appreciated that, in some examples, a sequence of code may include multiple high-pressure regions requiring multiple iterations of method 300 to reduce the register pressure of each such region.

In some embodiments, identifying the high-pressure region includes a number of sub-steps (not shown). First, a high-pressure position is identified based on the register pressure of the high-pressure position. For example, the position following N4 408 in FIG. 4A has register pressure 12, which may exceed a register pressure threshold of 10. Second, a subsequent instruction that is dependent on an output of an instruction at the high-pressure position is identified. For example, N5 410 (i.e. a subsequent instruction) is dependent upon instruction N4 408 (i.e. the instruction at the high-pressure position). Third, one or more additional instructions of the sequence of instructions are identified such that the subsequent instruction is directly dependent on an output of each additional instruction. For example, N5 410 is dependent upon both N4 408 and N3 406, so N3 406 is identified as an additional instruction. Fourth, the high-pressure region is defined as comprising the instruction at the high-pressure position (N4 408), the subsequent instruction (N5 410), and each additional instruction (N3 406). Thus, the high-pressure region is shown in FIG. 4A and FIG. 4B as high-pressure region 420.

At 306, a splitting factor is identified. In some embodiments, the splitting factor may be constrained by the degree of vectorization of the sequence of instructions: for example, a sequence of 3-length vector instructions may only be split by a splitting factor of 3, whereas a sequence of 4-length vector instructions may only be split by a splitting factor of 2 or 4. In examples presenting more than one possible splitting factor, some embodiments may select the smallest splitting factor (e.g., 2). In other embodiments, the splitting factor may be selected based on other factors, such as a predetermined operating parameter of the compiler 240.

At 308, an expected register pressure delta value of the high-pressure region achievable by the splitting factor is identified. The register pressure delta value indicates the difference (i.e. delta) between the highest register pressure of the high-pressure region before scalarization and after scalarization. It therefore indicates the degree of register pressure reduction achievable by splitting the vector instructions of the high-pressure region by the splitting factor. In some embodiments, the compiler 240 may calculate the expected register delta value by modeling the scalarization step 312 and reordering step 314 described below. In some embodiments, the expected register pressure delta may be calculated as (the register pressure peak height of the high-pressure region) minus (the register pressure peak height of the high-pressure region, divided by the splitting factor). Thus, for an example high-pressure region having a baseline register pressure of 8 registers and a register pressure peak height of 4 registers (for a total register pressure of 12 at the position of highest register pressure), being split by a splitting factor of 4, the expected register pressure delta may be calculated as (peak height 4 minus (peak height 4 divided by splitting factor 4=1))=expected register pressure delta 3. This would mean that the high-pressure region, after scalarization at the splitting factor of 4 and reordering at step 314, would have a new maximum expected register pressure of (prior maximum 12−delta 3)=9 registers.

At 310, optionally, in response to determining that the register pressure delta value does not satisfy a reduction criterion, the high-pressure region may be re-defined. In some examples, the high-pressure region may be re-defined to include one or more instructions directly dependent upon the output of one of the instructions in the initial definition 420 of the high-pressure region. For example, node N7 414, which is dependent upon the output of N5 410, may be included (along with the other nodes on which it depends) in re-defined high-pressure region 424. In some examples, the high-pressure region may be re-defined to include one or more instructions upon whose output one of the instructions in the initial definition of the high-pressure region is dependent. For example, nodes N1 402 and N2 404, upon which node N3 406 depends, may be included in re-defined high-pressure region 422.

In some embodiments, the reduction criterion is satisfied by a register pressure delta value that reduces a peak height of the register pressure of the high-pressure position below a peak height threshold, the peak height of the high-pressure position being defined as a difference between the register pressure of the high-pressure position and a baseline register pressure.

In other embodiments, the reduction criterion is satisfied by a register pressure delta value that reduces the register pressure of the high-pressure position below the register pressure threshold. Thus, the register pressure of the high-pressure position may be reduced either by reducing the register pressure peak height or by reducing the baseline register pressure.

At 311, optionally, in response to determining that the register pressure delta value does not satisfy a reduction criterion, the splitting factor may be adjusted in examples in which multiple different splitting factors are possible. In some embodiments, the compiler 240 may select the next highest splitting factor.

In some embodiments, steps 308 through 311 may be repeated one or more times until the reduction criterion is satisfied.

At 312, one or more vectorized instructions in the high-pressure region are split into shorter-length instructions. This step 312 may be referred to as a splitting or scalarization step. The degree to which the vector instructions of the high-pressure region are split will be a function of the splitting factor: in some examples, a long vector instruction will be split into a plurality of shorter-length vector instructions, whereas in some examples each vector instruction will be split into a plurality of scalar instructions.

Figure 5A:
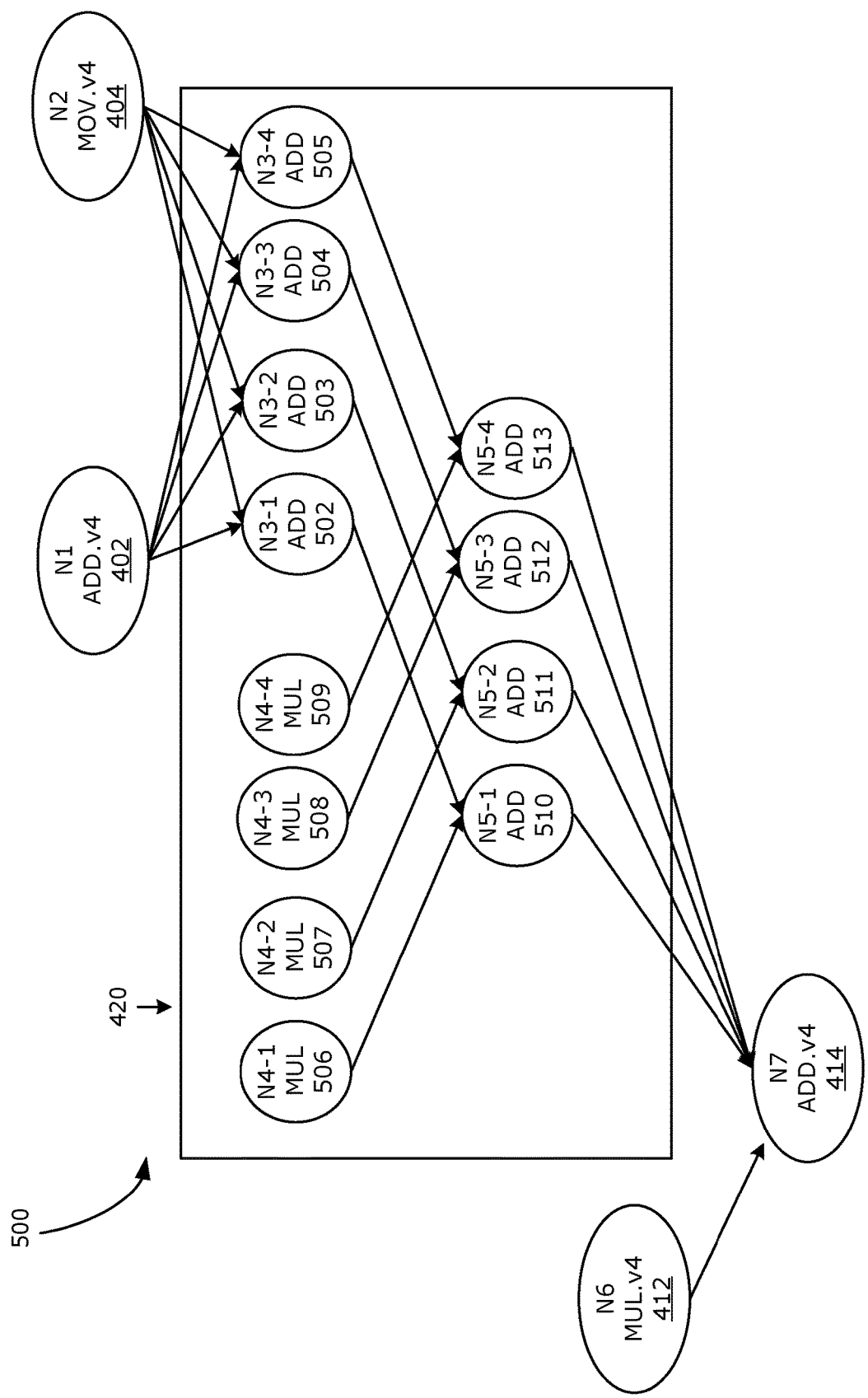
FIG. 5A is the graph of FIG. 4A after being scalarized in accordance with examples described herein.

FIG. 5A shows the graph of FIG. 4A after the high-pressure region 420 is scalarized at step 312 in accordance with a splitting factor of four. N3 406 has been split into four scalar ADD instructions, each using a single register: N3-1 502, N3-2 503, N3-3 504, and N3-4 505. N4 408 has been split into four scalar MUL instructions, each using a single register: N4-1 506, N4-2 507, N4-3 508, and N4-4 509. N5 410 has been split into four scalar ADD instructions, each using a single register: N5-1 510, N5-2 511, N5-3 512, and N5-4 513. The dependencies in the graph 500 have been updated accordingly.

Returning to FIG. 3, at 314, the shorter-length instructions are reordered such that the number of registers required to simultaneously store all values in use at the high-pressure position is reduced by the register pressure delta value.

Figure 5B:
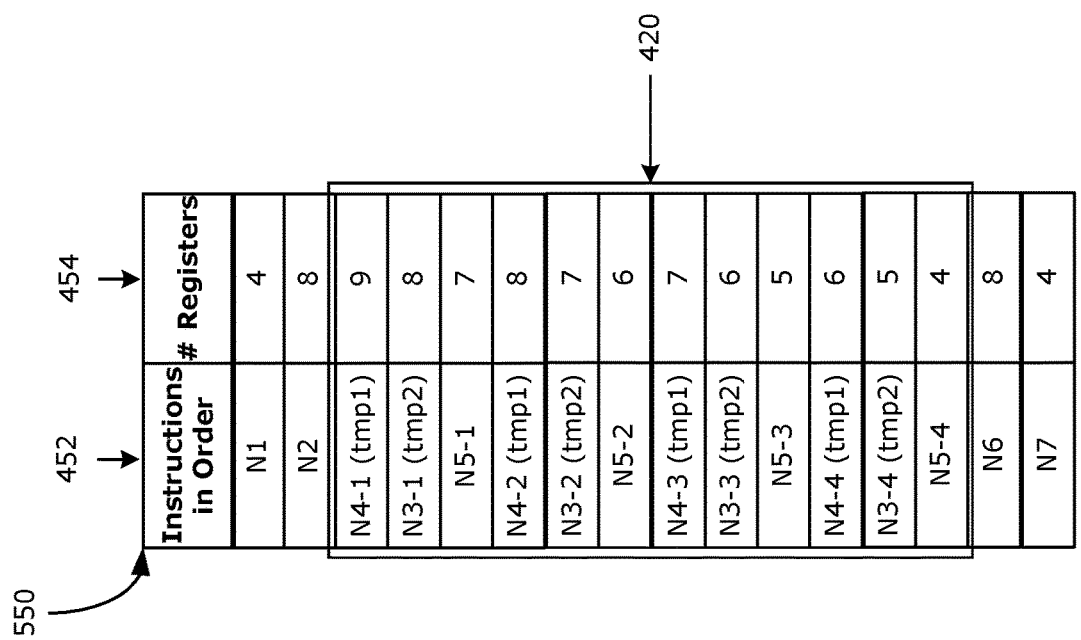
FIG. 5B is a table of register pressure values corresponding to various positions within the sequence of scalarized instructions of FIG. 5A.

FIG. 5B shows a table 550 of register pressure values corresponding to various positions within the sequence of scalarized instructions 500 of FIG. 5A. It will be appreciated that the vector instruction N3 406, N4 408, and N5 410 within the high-pressure region 420 have now been split into scalar instructions and reordered such that the highest register pressure within the high-pressure region 420 is 9, at the position following the execution of instruction N4-1 506 (storing the output of N4-1 506 in register tmp1). Thus, method 300 has achieved a register pressure delta value of 3 (i.e. 12 minus 9). This corresponds to a splitting factor of 4 used to split the high-pressure region's peak height (highest register pressure 12 minus baseline register pressure 8=peak height 4) by a factor of 4 (new peak height=4/4=1, plus baseline of 8=9). The baseline register pressure is determined in this example as the higher of a register pressure at the beginning of the high-pressure region (8 following N2 404), and a register pressure at the end of the high-pressure region (4 following N5-4 513).

In reordering the shorter-length instructions at step 314, the new order of instructions within the high-pressure region 420 consists of multiple blocks of shorter-length instructions (e.g., a first block consisting of N4-1, N3-1, and N5-1, a second block consisting of N4-2, N3-2, and N5-2, and so on for four blocks total). It will be appreciated that, within each block, the order of instructions corresponds to the original ordering of the original-length instructions (i.e. N4, N3, N5), and each block corresponds to a vector element that has the same position within each original vector (i.e. the first block corresponds to vector element 1, the first block corresponds to vector element 2, etc.).

At 316, the modified sequence of instructions (i.e. the original sequence of instructions with the high-pressure region replaced by the reordered, partially- or fully-scalarized instructions) is compiled by the compiler 240 into machine code executable by the flexible vector processor device 255. It will be appreciated that, in some examples, steps 304 through 314 may optionally be repeated for each of a plurality of high-pressure regions before performing step 316.

In some embodiments, the register pressure delta value calculated at step 308 may not reflect the actual register pressure delta value achievable through scalarization step 312 and reordering step 314. The expected register pressure delta value may be accurate for vectors that comply with certain constraints, but not for others. For example, in the context of some flexible vector processor devices, the various instructions in the high-pressure region may not all have the same vector width. In such examples, the compiler 240 may need to calculate an expected register pressure delta value based on a heterogeneous mix of vector lengths of the instructions. In some such examples, the compiler 240 may identify an expected register pressure delta value at step 308 with reference to an average vector width of the vector instructions of the high-pressure region. The average may be calculated as, e.g., the mean, median, or modal vector length of each vector instruction in the high-pressure region. In a second example, the source code may be written such that the lanes of the vector instructions are shuffled, i.e., the registers used to store the elements of a vector involved in a vector operation are not consecutive according to the order of the vector elements. In some such examples, these vector instructions may be treated by the compiler 240 as being scalar operations and not included in the calculation of the expected register pressure delta value at step 308. Reordering step 314 may also need to account for such shuffling in determining the optimal order for scalarized instructions.

Suggestive Vectorization with Burst Aware Scheduling Heuristics

The method 300 described above with reference to FIGS. 3-5B is a first example for how to scalarize vector instructions to improve performance of a flexible vector processor by decreasing register pressure. A second example technique for instruction scalarization will now be described.

Figure 6:
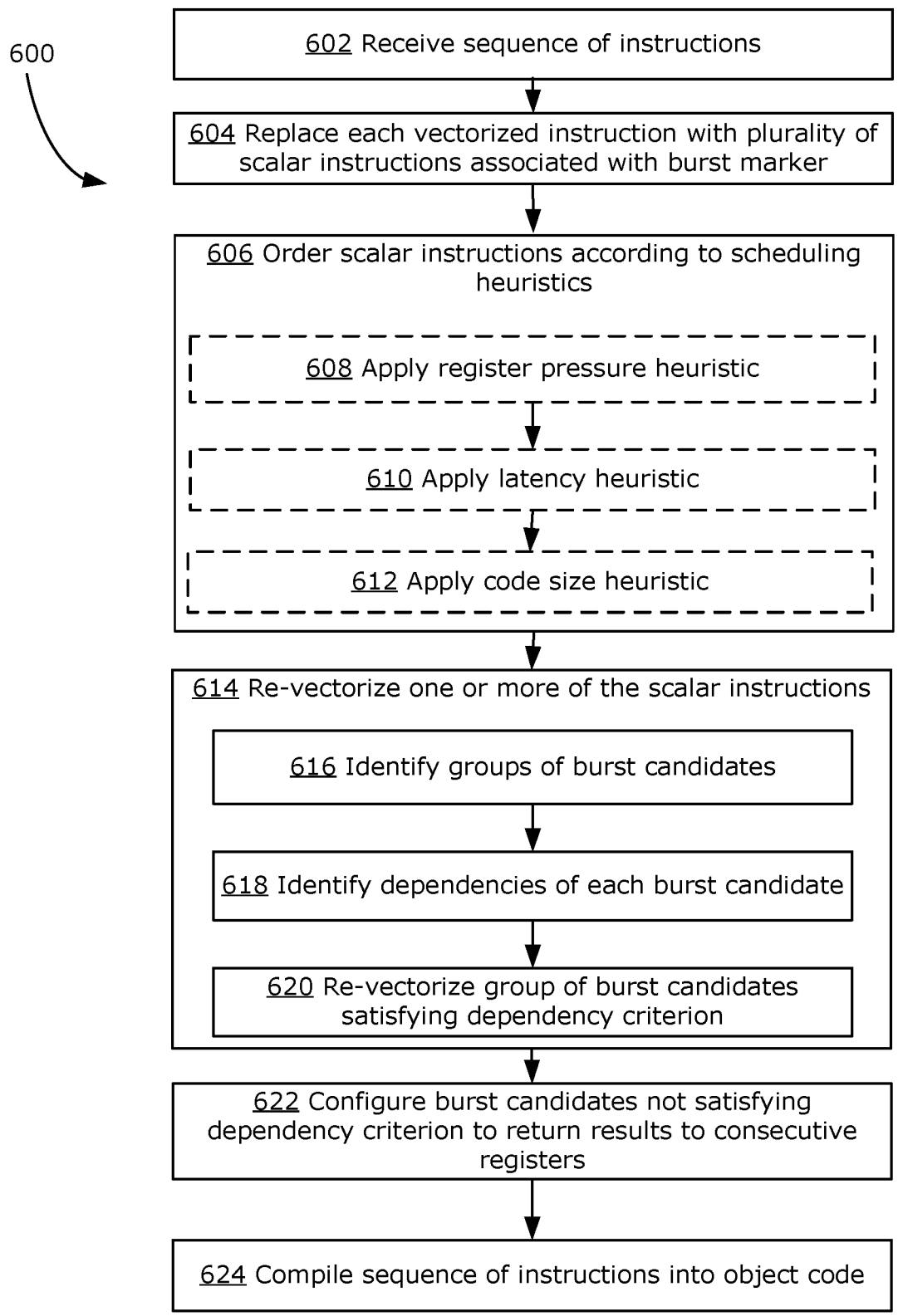
FIG. 6 is a flowchart showing steps of a second example method for reducing register pressure in a sequence of instructions, in accordance with examples described herein.

FIG. 6 is a flowchart showing steps of a second example method 600 for reducing register pressure in a sequence of instructions. As in FIG. 3, optional steps are shown using dashed lines. Vector instructions in a sequence of instructions are fully scalarized (i.e. converted into individual scalar instructions operating on single scalar values instead of vectors). However, the scalarized instructions are maintained by the scheduler in association with a burst marker identifying the original vector instruction (or "burst") from which the scalar instruction derives, along with optionally an indication of the scalar instruction's position within the burst. Once the scalar instructions have been scheduled, some of the scalar instructions may be re-vectorized if they meet certain criteria, thereby realizing the register pressure reduction from scalarization while also capturing some of the parallelism and/or code size efficiencies of vectorization. The second example method 600 may be referred to herein as "suggestive vectorization", using "burst aware scheduling".

At 602, a sequence of instructions is received, as in step 302 of method 300. The steps of method 600 may be performed by a post-RA scheduler in some embodiments, as with method 300.

At 604, each vectorized instruction is replaced by the compiler 240 with a plurality of scalar instructions. Each scalar instruction is associated with a burst marker. An example sequence of scalar instructions resulting from the application of step 604 is shown in FIG. 7.

Figure 7:
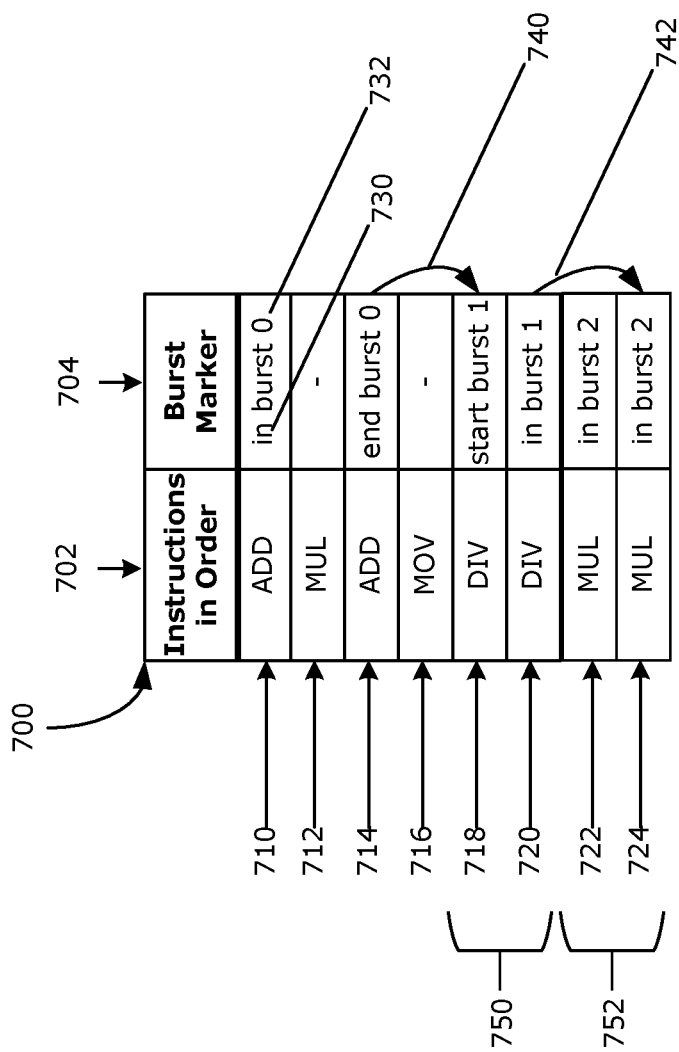
FIG. 7 is a table showing operations, burst markers, and dependencies of a sequence of scalar instructions generated in accordance with the scalarization step of the method of FIG. 6.

FIG. 7 is a table 700 showing operations, burst markers, and dependencies of a sequence of scalar instructions generated in accordance with scalarization step 604 of method 600. Each row of the table corresponds to a scalar instruction generated by step 604, scheduled in descending order by row. For each scalar instruction, an operation type 702 and burst marker 704 of the instruction are shown. The operation type 702 shows the nature of the operation performed by the instruction, such as addition (ADD), multiplication (MUL), division (DIV), or move (MOV). Because the instructions are all scalar instructions, the operations all operate on single scalar values and generate scalar values as their results.

The burst marker 704 for each scalar instruction includes a burst identifier 732, such as a burst ID number, corresponding to the vectorized instruction from which the scalar instruction is generated. In the illustrated example, each burst marker 704 also includes position information 730 regarding a position of the scalar instruction within the burst (e.g., the start of the burst indicated by "start", the end of the burst indicated by "end", or an operation within the interior of the burst indicated by "in"). The position of the scalar instruction within the burst corresponds to a position within the vectorized instruction of an operation corresponding to the scalarized instruction. Thus, if scalar instruction 710 (ADD, in burst 0) corresponds to an ADD operation performed on a second element within a length-4 vector by the original length-4 vectorized instruction, the position information 730 "in" indicates that the scalar instruction 710 is within the interior of the burst (i.e., it is not the beginning of the burst at element 1 or the end of the burst at element 4).

Dependencies between the scalar instructions of the table 700 are indicated with arrows 740, 742 from earlier instructions to later instructions, as in graph 400 in FIG. 4A and graph 500 in FIG. 5A.

Thus, for each of a plurality of vectorized instructions of the sequence, the vectorized instruction (e.g. a vector ADD instruction corresponding to burst 0) is replaced with a plurality of scalar instructions (e.g. scalar ADD instructions 710, 714, and any other instructions included in burst 0) such that each scalar instruction is associated with a burst marker 704 identifying the scalar instruction as part of a burst corresponding to the vectorized instruction.

Returning to FIG. 6, at 606, the scalar instructions are ordered (e.g., by the post-RA scheduler) according to one or more scheduling heuristics. Three optional heuristics 608, 610, 612 are shown as sub-steps of step 606. Any combination of these heuristics, applied in any order of priority, and/or in combination with other scheduling heuristics, may be used to order the scalar instructions generated at step 604.

At 608, a register pressure heuristic may be applied to order the scalar instructions to optimize (i.e. minimize or reduce) register pressure. At 610, a latency heuristic may be applied to order the scalar instructions to minimize latency. At 612, a code size heuristic may be applied to order the scalar instructions to minimize code size by ordering two or more scalar instructions identified as part of the same burst adjacent to each other, thereby assisting with the re-vectorization of the scalar instructions, as will be described below at step 614. In some embodiments, the three scheduling heuristics may be applied in the order of priority shown: 608 is applied to optimize register pressure, after which 610 is applied within the constraints of 608 to optimize latency, after which 612 is applied within the constraints of 608 and 610 to optimize code size.

At 614, one or more of the scalar instructions are re-vectorized. Step 614 consists of several sub-steps 616, 618, and 620.

At 616, groups of burst candidates are identified. A Group of burst candidates is any group of two or more consecutive scalar instructions (i.e. consecutive rows of table 700) that are associated with burst markers 704 having the same burst identifier 732. Thus, for example, in table 700, scalar instructions 718 and 720 are identified as a first group of burst candidates 750 because they are consecutive and both belong to burst 1. Similarly, scalar instructions 722 and 724 are identified as a second group of burst candidates 752 because they are consecutive and both belong to burst 2. Burst candidates are potential candidates for re-vectorization with the other candidates in their groups.

At 618, the dependencies of each burst candidate are identified. In table 700, instruction 718 (a burst candidate) depends on the output of instruction 714. Similarly, instruction 724 (a burst candidate) depends on the output of instruction 720. Thus, instruction 714 is a dependency of instruction 718, and instruction 720 is a dependency of instruction 724.

At 620, each group of burst candidates is re-vectorized (e.g., by the compiler) if the group of burst candidates satisfies a dependency criterion. In some embodiments, the dependency criterion is that no burst candidates within the group have any dependencies that are not themselves burst candidates. Thus, in table 700, instructions 718 and 720 are burst candidates in a first group 750 of burst candidates. However, because instruction 718 depends on instruction 714, which is not a burst candidate, group 750 does not satisfy the dependency criterion and is not re-vectorized. In contrast, instructions 722 and 724 are burst candidates in a second group 752 that does satisfy the dependency criterion, because the only dependency of the candidates in the group 752, namely instruction 720, is itself a burst candidate. Thus, scalar instructions 722 and 724 of the second group 752 are re-vectorized into a 2-length vector MUL instruction at step 620.

It will be appreciated that two or more consecutive burst candidates of a group that also includes one or more additional consecutive burst candidates may be re-vectorized without the additional consecutive burst candidates if the additional consecutive burst candidates do not satisfy the dependency criterion. The two or more consecutive burst candidates that do satisfy the dependency criterion can be considered members of their own sub-group that does not include the additional burst candidates. Thus, if a further MUL instruction (not shown) followed instruction 724 and was also marked as part of burst 2, but had a dependency on a non-burst candidate (e.g., instruction 716), instruction 722 and 724 would be re-vectorized but the further MUL instruction from burst 2 would remain a scalar instruction.

At 622, any scalar instructions that are burst candidates but do not satisfy the dependency criterion remain as scalar instructions but are configured to return their results to consecutive registers. Thus, for example, because instructions 718 and 720 are burst candidates but have not been re-vectorized, they are each configured at step 622 to return the results of their respective DIV operations to consecutive registers.

At 624, the compiler 240 compiles the new sequence of instructions generated by steps 604 through 622 into machine code executable by a flexible vector processor device 255, as in step 316 of method 300.

By reducing the risk of spilling using the techniques described above, such as methods 300 and 600 for compiling machine code, the throughput (i.e. number of instructions executed per second) of flexible vector processor devices may be improved, thereby enhancing the speed and reducing the power consumption of computing hardware such as GPUs and CPUs. The described techniques may therefore result in the improved functioning of computing hardware.

GENERAL

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for reducing a number of registers required to execute a sequence of instructions using a processor device, the processor device being configured to execute vectorized instructions, a vectorized instruction comprising a single operation performed on a plurality of values, the method comprising:
receiving the sequence of instructions;
replacing a first vectorized instruction of the sequence with a first plurality of shorter-length instructions;
replacing a second vectorized instruction of the sequence with a second plurality of shorter-length instructions;
reordering the first plurality of shorter-length instructions and the second plurality of shorter-length instructions such that:
the sequence includes a plurality of blocks of shorter-length instructions, each block including a shorter-length instruction of the first plurality of shorter-length instructions and a shorter-length instruction of the second plurality of shorter-length instructions; and a register pressure of the processor device at a first position in the sequence of instructions is reduced, the register pressure indicating a number of registers required to store a set of inputs and a set of outputs of the sequence of instructions at a position in the sequence of instructions; and compiling the sequence of instructions into machine code executable by the processor device, wherein each shorter-length instruction comprises:
a scalar instruction; or
a vectorized instruction having a vector length shorter than a vector length of the vectorized instruction being replaced.

2. The method of claim 1, further comprising:
identifying a high-pressure region of the sequence of instructions including at least one high-pressure position at which the register pressure is above a register pressure threshold;
replacing each of one or more vectorized instructions in the high-pressure region with a plurality of shorter-length instructions; and
reordering the shorter-length instructions such that the register pressure at the high-pressure position is reduced.

3. The method of claim 2, wherein identifying the high-pressure region comprises:
identifying the high-pressure position based on the register pressure of the high-pressure position;
identifying a subsequent instruction that is dependent on an output of an instruction at the high-pressure position;
identifying one or more additional instructions of the sequence of instructions such that the subsequent instruction is directly dependent on an output of each additional instruction; and
defining the high-pressure region as comprising the instruction at the high-pressure position, the subsequent instruction, and each additional instruction.

4. The method of claim 3, wherein replacing each vectorized instruction in the high-pressure region with a plurality of shorter-length instructions comprises:
identifying a splitting factor for the high-pressure region;
splitting each vectorized instruction into a number of shorter-length instructions equal to the splitting factor; and
reordering the shorter-length instructions,
such that the number of registers required to simultaneously store all values in use at the high-pressure position is reduced by a register pressure delta value.

5. The method of claim 4, further comprising, after identifying the high-pressure region:
identifying an expected register pressure delta value that can be achieved through replacing each vectorized instruction in the high-pressure region with a plurality of shorter-length instructions using the splitting factor and reordering the shorter-length instructions; and
in response to determining that the expected register pressure delta value does not satisfy a reduction criterion:
re-defining the high-pressure region to include:
one or more instructions directly dependent upon the output of one of the instructions in the initial definition of the high-pressure region; or
one or more instructions upon whose output one of the instructions in the initial definition of the high-pressure region is dependent.

6. The method of claim 5, wherein the reduction criterion is satisfied by an expected register pressure delta value that reduces the register pressure of the high-pressure position below the register pressure threshold.

7. The method of claim 5, wherein the reduction criterion is satisfied by an expected register pressure delta value that reduces a peak height of the register pressure of the high-pressure position below a peak height threshold, the peak height of the high-pressure position being defined as a difference between the register pressure of the high-pressure position and a baseline register pressure.

8. The method of claim 7, wherein the baseline register pressure is the higher of:
a register pressure at the beginning of the high-pressure region; and
a register pressure at the end of the high-pressure region.

9. The method of claim 1, wherein
each shorter-length instruction of the first plurality of shorter-length instructions is a scalar instruction associated with a burst marker identifying the scalar instruction as part of a first burst corresponding to the first vectorized instruction; and
each shorter-length instruction of the second plurality of shorter-length instructions is a scalar instruction associated with a burst marker identifying the scalar instruction as part of a second burst corresponding to the second vectorized instruction.

10. The method of claim 9, wherein:
the burst marker of each scalar instruction of the first plurality of shorter-length instructions includes a burst identifier corresponding to the first vectorized instruction; and
the burst marker of each scalar instruction of the second plurality of shorter-length instructions includes a burst identifier corresponding to the second vectorized instruction.

11. The method of claim 9, wherein:
the burst marker of each scalar instruction of the first plurality of shorter-length instructions includes position information regarding a position of the scalar instruction within the first burst, the position of the scalar instruction within the first burst corresponding to a position within the first vectorized instruction of an operation corresponding to the scalarized instruction; and
the burst marker of each scalar instruction of the second plurality of shorter-length instructions includes position information regarding a position of the scalar instruction within the second burst, the position of the scalar instruction within the second burst corresponding to a position within the second vectorized instruction of an operation corresponding to the scalarized instruction.

12. The method of claim 11, further comprising:
ordering the scalar instructions of the first plurality of shorter-length instructions and the second plurality of shorter-length instructions according to one or more scheduling heuristics; and
re-vectorizing two or more of the scalar instructions.

13. The method of claim 12, wherein the one or more scheduling heuristics include at least one heuristic selected from the following:
a register pressure heuristic for minimizing register pressure;

a latency heuristic for minimizing latency; and a code size heuristic for minimizing code size by ordering two or more scalar instructions identified as part of the same burst adjacent to each other.

14. The method of claim 13, wherein re-vectorizing two or more of the scalar instructions comprises:

identifying one or more groups of burst candidates, each group of burst candidates comprising a plurality of adjacent instructions identified as belonging to the same burst, each instruction in a group of burst candidate being a burst candidate;

for each burst candidate, identifying all dependencies of the burst candidate, each dependency being an instruction upon whose output the burst candidate directly depends; and in response to determining that the dependencies of a first burst candidate are all burst candidates, re-vectorizing the group of burst candidates including the first burst candidate.

15. The method of claim 14, further comprising:

in response to determining that at least one dependency of a second burst candidate is not a burst candidate, configuring the group of burst candidates including the second burst candidate such that the instructions in the group return their results to a group of consecutive registers.

16. A device comprising:

a processor device configured to execute vectorized instructions, a vectorized instruction comprising a single operation performed on a plurality of values;

a memory storing machine code executable by the processor device, the machine code being compiled according to the method of claim 1.

17. A device comprising:

a processor device configured to execute vectorized instructions, a vectorized instruction comprising a single operation performed on a plurality of values;

a memory storing machine code executable by the processor device, the machine code being compiled according to the method of claim 9.

18. A non-transitory processor-readable medium having tangibly stored thereon machine code executable by a processor device configured to execute vectorized instructions, the machine code being compiled according to the method of claim 1.

19. A non-transitory processor-readable medium having tangibly stored thereon machine code executable by a processor device configured to execute vectorized instructions, the machine code being compiled according to the method of claim 9.

* * * * *